US008472705B2

(12) United States Patent
He

(10) Patent No.: US 8,472,705 B2
(45) Date of Patent: Jun. 25, 2013

(54) SYSTEM, METHOD, AND APPARATUS FOR SELECTING ONE OR MORE REPRESENTATIVE IMAGES

(75) Inventor: Xiaofei He, Hangzhou (CN)

(73) Assignee: Yahoo! Inc., Sunnyvale, CA (US)

( * ) Notice: Subject to any disclaimer, the term of this patent is extended or adjusted under 35 U.S.C. 154(b) by 1405 days.

(21) Appl. No.: 12/126,801

(22) Filed: May 23, 2008

(65) Prior Publication Data

US 2009/0290813 A1 Nov. 26, 2009

(51) Int. Cl.
*G06K 9/00* (2006.01)
(52) U.S. Cl.
USPC ........... 382/155; 382/159; 382/160; 382/181; 382/305; 382/307; 707/4; 707/5; 707/6
(58) Field of Classification Search
USPC ...... 382/155, 159, 160, 181, 305–307; 707/4, 707/5, 6
See application file for complete search history.

(56) References Cited

U.S. PATENT DOCUMENTS 6,859,802 B1 * 2/2005 Rui .................................... 1/1
2009/0150376 A1 * 6/2009 O'Callaghan et al. ............ 707/5

OTHER PUBLICATIONS

U.S. Appl. No. 11/837,570, filed Aug. 13, 2007, 26 pages; Drawings for U.S. Appl. No. 11/837,570, filed Aug. 13, 2007, 5 pages; Filing Receipt for U.S. Appl. No. 11/837,570, filed Aug. 13, 2007, 3 pages.
Belkin et al., Manifold Regularization: A Geometric Framework for Learning From Examples, *Journal of Machine Learning Research*, 7:2399-2434, 2006.
Cohn et al., "Active Learning with Statistical Models", *Journal of Artificial Intelligence Research*, 4:129-145, 1996.
Dong et al., "A New Semi-Supervised Em Algorithm for Image Retrieval", in *IEEE Conference on Computer Vision and Pattern Recognition*, Madison, WI, 2003.
Flaherty et al., "Robust Design of Biological Experiments", in *Advances in Neural Information Processing Systems 18*, Vancouver, Canada, 2005.
Goh et al., "Multimodal Concept-dependent Active Learning for Image Retrieval", in *Proceedings of the ACM Conference on Multimedia*, New York, Oct. 2004, p. 564-571.
He, "Incremental Semi-Supervised Subspace Learning for Image Retrieval", in Proceedings of the ACM Conference on Multimedia, New York, Oct. 2004.
Hoi et al., "A Semi-Supervised Active Learning Framework for Image Retrieval", in *IEEE International Conference on Computer Vision and Pattern Recognition*, San Diego, CA, 2005.
Huijsmans et al., "How to Complete Performance Graphs in Content-based Image Retrieval: Add Generality and Normalize Scope", *IEEE Transactions on Pattern Analysis and Machine Intelligence*, 27(2):245-251, Feb. 2005.
Lin et al., "Semantic Manifold Learning for Image Retrieval", in *Proceedings of the ACM Conference on Multimedia*, Singapore, Nov. 2005, 10 pages.
Rui et al., "Relevance Feedback: A Power Tool for Interactive Content-based Image Retrieval", *IEEE Transactions on Circuits and Systems for Video Technology*, 8(5), Sep. 1998, pp. 644-655.
Smeulders et al., "Content-based Image Retrieval at the End of the Early Years", *IEEE Transactions on Pattern Analysis and Machine Intelligence*, 22(12):1349-1380, Dec. 2000.

(Continued)

*Primary Examiner* — Wesley Tucker
(74) *Attorney, Agent, or Firm* — Berkeley Law & Technology Group, LLP

(57) ABSTRACT

Embodiments of methods, apparatuses, devices and systems associated with one or more representative images are disclosed.

23 Claims, 3 Drawing Sheets

OTHER PUBLICATIONS

Chang et al., "Support Vector Machine Active Learning for Image Retrieval", in *Proceeding of the ninth ACM international conference on Multimedia*, pp. 107-118, 2001.

Yu et al., "Color Texture Moments for Content-based Image Retrieval", in *International Conference on Image Processing*, pp. 24-28, 2002.

Yu et al., "Active Learning via Transductive Experimental Design", in *Proceedings of the 23$^{rd}$ International Conference eon Machine Learning*, Pittsburgh, PA, 2006, 8 pages.

He, et al, "Laplacian Optimal Design for Image Retrieval," SIGIR '07, Jul. 23-27, 2007, Amsterdam, The Netherlands, 8 Pages.

* cited by examiner

SYSTEM, METHOD, AND APPARATUS FOR SELECTING ONE OR MORE REPRESENTATIVE IMAGES

FIELD

Claimed subject matter relates to the field of training an information retrieval process, and more specifically to improving images selection for training an image retrieval process.

BACKGROUND

The World Wide Web provides access to a vast amount of information, including data and images. Due to the vast amount of information available, search processes and search engines may be of particular use for locating desirable information. For example, one or more search engines or image retrieval processes may be used to locate potentially desirable search results, such as information and images, and present those search results to a user. In this example, one or more search engines or image retrieval processes may rank the search results based at least in part on one or more ranking processes. However, ranking processes may not always present a particular user with the most desirable search results. Under some circumstances, machine learning processes may be employed to improve ranking processes and their corresponding ranking of search results. Efforts to improve the performance of machine learning processes and ranking processes are ongoing.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
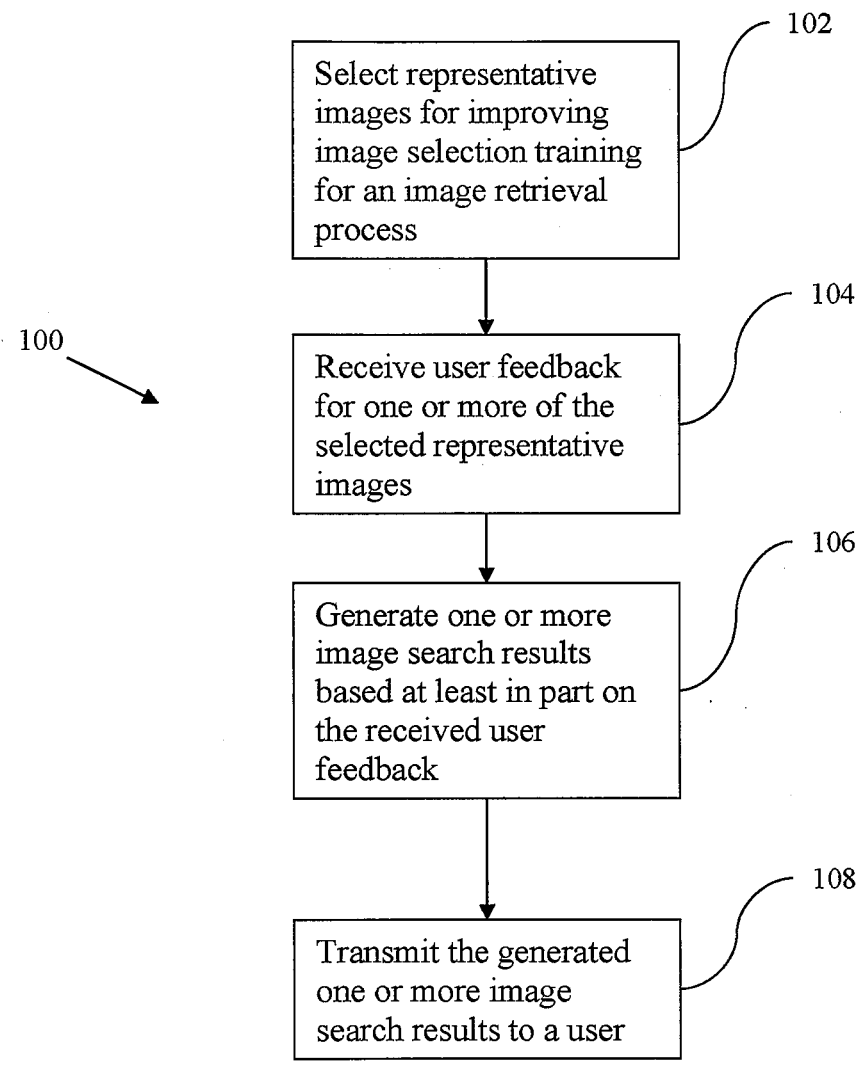
FIG. 1 is a flow chart of a method in accordance with an embodiment.

In the following detailed description, numerous specific details are set forth to provide a thorough understanding of the claimed subject matter. However, it will be understood by those skilled in the art that the claimed subject matter may be practiced without these specific details. In other instances, methods, procedures, components or circuits that would be known by one of ordinary skill have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Unless specifically stated otherwise, as apparent from the following discussion, it is appreciated that throughout this specification discussions utilizing terms such as "processing," "computing," "calculating," "selecting," "forming," "initiating," "querying," "obtaining," "representing," "modifying," "receiving," "transmitting," "storing," "determining" and/or the like refer to the actions or processes that may be performed by a computing platform, such as a computer or a similar electronic computing device, that manipulates or transforms data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combinations thereof. Further, unless specifically stated otherwise, a process as described herein, with reference to flow diagrams or otherwise, may also be executed or controlled, in whole or in part, by a computing platform.

With regard to machine learning and information retrieval processes, there often is no shortage of unlabeled data. For example, in a given image library only a small portion of the images may be labeled, such as with a user preference or ranking. "Labeled images" as used herein may comprise one or more images which have been ranked, such as by a user in conjunction with a ranking or learning process. "Unlabeled images" as used herein may comprise one or more images which have not been ranked, such as by a user in conjunction with a ranking or learning process. "Ranked images" as used herein may comprise an image that has been assigned a relative position or degree of value relative to one or more other images in a data set. "Unranked images" as used herein may comprise an image that has not been assigned a relative position or degree of value relative to one or more other images in a data set. "Images" as used herein, may comprise one or more machine readable files including data, which under some circumstance may correspond to one or more graphical representations. For example, a computing platform may be operable to produce a graphical depiction on a display device based at least in part on an image. For additional example, an image may comprise a computer designed graphic, a digital photograph, a frame from a digital movie, a scanned analog photo, or a screen capture from a movie, to name but a few example. The process of obtaining labels for the unlabeled data may be time consuming and difficult. Accordingly, it may be advantageous to determine which unlabeled images may be desirable for use in a machine learning or training process. For example, it may be advantageous to determine a set of unlabeled images which may be good candidates for receiving labels and improving an image selection process. An active learning process may, under some circumstances, reduce the time and complexity for obtaining labels for previously unlabeled images.

In an embodiment, such as a content based image retrieval (CBIR) process or system, one or more images may be described based at least in part on one or more aspects of their content, rather than described based at least in part on a textual reference of the image content. CBIR may relate to an image retrieval process or system that at least in part analyzes the content of an image. Content of an image may relate to colors, shapes, textures, or any other information that can be derived from an image. For example, one or more features of an image, such as color, texture, shape, etc. may be extracted from an image and used, at least in part, to describe that image. In an embodiment, a representation of color of an image may comprise a histogram that identifies a proportion of image pixels within a range of values, such as within a range of colors, for example. In an embodiment, texture comprises a representation of one or more visual patterns in an image and a spatial relationship between those patterns. A representation of texture, under some circumstances, may comprise one or more texels which may be placed into one or more sets. In an embodiment, a number of sets may depend, at least in part, on a number of textures detected within an image. The sets may represent textures within an image and a location within an image for a specific texture. In an embodiment, textures with in an image may be determined, at least in part, by modeling texture as a two-dimensional gray level variation. For example, relative brightness of a pair of pixels may be computed, at least in part, so that a degree of contrast regularity, coarseness, and directionality may be estimated. Shape may relate to a shape of a particular region within an image. In an embodiment, one or more shapes may be determined by applying a segmentation or edge detecting process to an image. Under some circumstances, in an automated segmentation process, it may be desirable to have a quality control process after segmentation has occurred, for example. However, under some circumstances, the extracted features may not always accurately characterize one or more semantic concepts associated with an image. Accordingly, to improve performance of a CBIR process or system, user feedback, such as relevance feedback, may be employed to improve a correlation between extracted features and semantic concepts associated with one or more images.

In one or more CBIR processes or systems a user may be asked to provide feedback, such as a perceived relevance, for one or more images selected by the system. Under some circumstances, the selected images may comprise a set of search results determined by a search engine and one or more ranking processes. In this example, received user feedback may be associated with the images as one or more labels. The labeled images may then used to train an image selection process to help differentiate between images that more closely correspond the query concept and images that less closely correspond to the query concept. However, under some circumstances, the presented search results may be a less useful set of images for generating user feedback. For example, if the search results only include images that a user eventually ranks as positive then it may be difficult to improve the image selection process due to a lack of negatively labeled images. Accordingly, it may be advantageous to determine a set of images for receiving user feedback based at least in part on a usefulness of the images to the training process.

In at least one embodiment, an active learning process, such as a Laplacian Design (LD), may be advantageous for training an image retrieval process or system, for example. In this embodiment, a set of representative images, including both labeled and unlabeled images, may be selected for receiving user feedback. "Representative" as used herein may comprise one or more images which, under some circumstances may include one or more characteristics of other images within a data set. For example, a set of representative images, including labeled and unlabeled images, may be selected so that a loss function for an LD is relatively smooth on a local basis. For example, if one or more images are sufficiently close based at least in part on their extracted features, then the one or more images may be expected to receive a similar or sufficiently close label. In at least one embodiment, selecting representative images in this way may result in a set of representative images that do not necessarily correspond to highly ranked search results, for example.

FIG. 1 is a flow chart of a method in accordance with an embodiment 100. With regard to box 102, an embodiment 100, such as a method which may be performed by one or more computing platforms, may be operable to select one or more representative images for training an image retrieval process or system, such as a CBIR process or system, for example. In an embodiment, selecting representative images may comprise selecting one or more images, including labeled and unlabeled images, from a data set, such as an image library. For example, a training process may select one or more representative images based at least in part on one or more extracted features of those images so that the selected images include both labeled and unlabeled images. The representative images may be selected, at least in part, by solving the following relationship for an extreme value, such as a Laplacian Design (LD) as follows:

$$\min_{z=(z1,\ldots,zk)} Tr(X^T(ZZ^T + \lambda_1 XLX^T + \lambda_2 I)^{-1} X)$$

Wherein X is a matrix including feature vectors for one or more images in the data set. Wherein Z is a matrix including feature vectors for the representative images. Wherein Tr comprises a matrix trace operation. Wherein I comprises an identity matrix. Wherein $\lambda_1$ comprises a first parameter. Wherein $\lambda_2$ comprises a second parameter. Wherein L is a matrix defined as L=D−S, where S is a weight matrix including one or more weighting parameters, and D is a diagonal matrix where one or more i-th diagonal entries comprises an i-th row sum of S. Wherein Sij is a similarity measure of the i-th image and the j-th image in an image data set.

In at least one embodiment, the parameters $\lambda_1$ and $\lambda_2$ may comprise an empirical value, such as 0.1 or 0.001, respectively, for example. Based at least in part on determining a extreme value for the above equation, one or more images may be selected for use in training an image retrieval process or system, such as a CBIR system, for example. With regard, to box 104, the process may receive user feedback relative to one or more of the selected representative images. For example, a user may rate one or more of the representative images as relevant or not relevant. In addition, as user may rate one or more of the representative images based at least in part on a relevance scale, such as highly relevant, relevant, somewhat relevant, somewhat not relevant, or not relevant, for example.

In an embodiment, the received user feedback may be used, in conjunction with one or more functions, at least in part to recalculate a relevance value for one or more of the images in the data set. For example, in conjunction with one or more loss functions, a weight vector may be calculated for determining a new relevance value for one or more images in the data set. In an embodiment, if one or more images in a data set, such as images represented by points xi and xj, are sufficiently close to one another, then their respective one or more extracted features, such as feature vectors f(xi) and f(xj) may likewise be close as well. For example, a loss function for the data set, based at least in part on a geometric structure of the data set may be presented as follows, wherein S represents a similarity matrix:

$$Jo(w) = \sum_{i=1}^{k} (f(z_i) - y_i)^2 + \frac{\lambda}{2} \sum_{i,j=1}^{m} (f(x_i) - f(x_j))^2 S_{ij}$$

In this embodiment, yi may comprise a measurement, such as a label, associated with an image zi. A loss function, as shown above, including a choice of symmetric weighting functions (e.g. Sij (Sij=Sji) may incur a penalty if neighboring points xi and xj are mapped far apart. Accordingly, attempting to attain a relatively minimal value for Jo (w) may held ensure that if xi and xj are close then f(xi) and f(xj) may be close as well, for example. A loss function, such as described above, may be used, at least in part, to determine a weight, such as a weight vector for one or more images in the data set and one or more features associated with one or more of the images in the data set.

With regard to box 106, the process may generate one or more image search results based at least in part on the received user feedback. For example, the process may calculate a weighting function, or vector, for one or more of the images in the data set based at least in part on the received user feedback, such as in conjunction with the above loss function. In an embodiment, the method may generate one or more image search results based at least in part on the determined weighting functions and transmit the generated one or more image search results to a user, as shown in box 108, for example.

It should of course be noted, that the methods and processes described herein, may be capable of being performed by one or more computing platforms. In addition, the method and processes described herein may be capable of being stored on a storage medium as one or more machine readable instructions, that if executed, such as by one or more computing platforms, may be adapted to enable a computing platform to perform one or more actions. "Storage medium" as referred to herein relates to media capable of maintaining expressions which are executable by one or more machines, such as one or more computing platforms. For example, a storage medium may comprise one or more storage devices for storing machine-readable instructions or information. Such storage devices may comprise any one of several media types including, for example, magnetic, optical or semiconductor storage media. However, these are merely examples of a storage medium and claimed subject matter is not limited in these respects.

Figure 2:
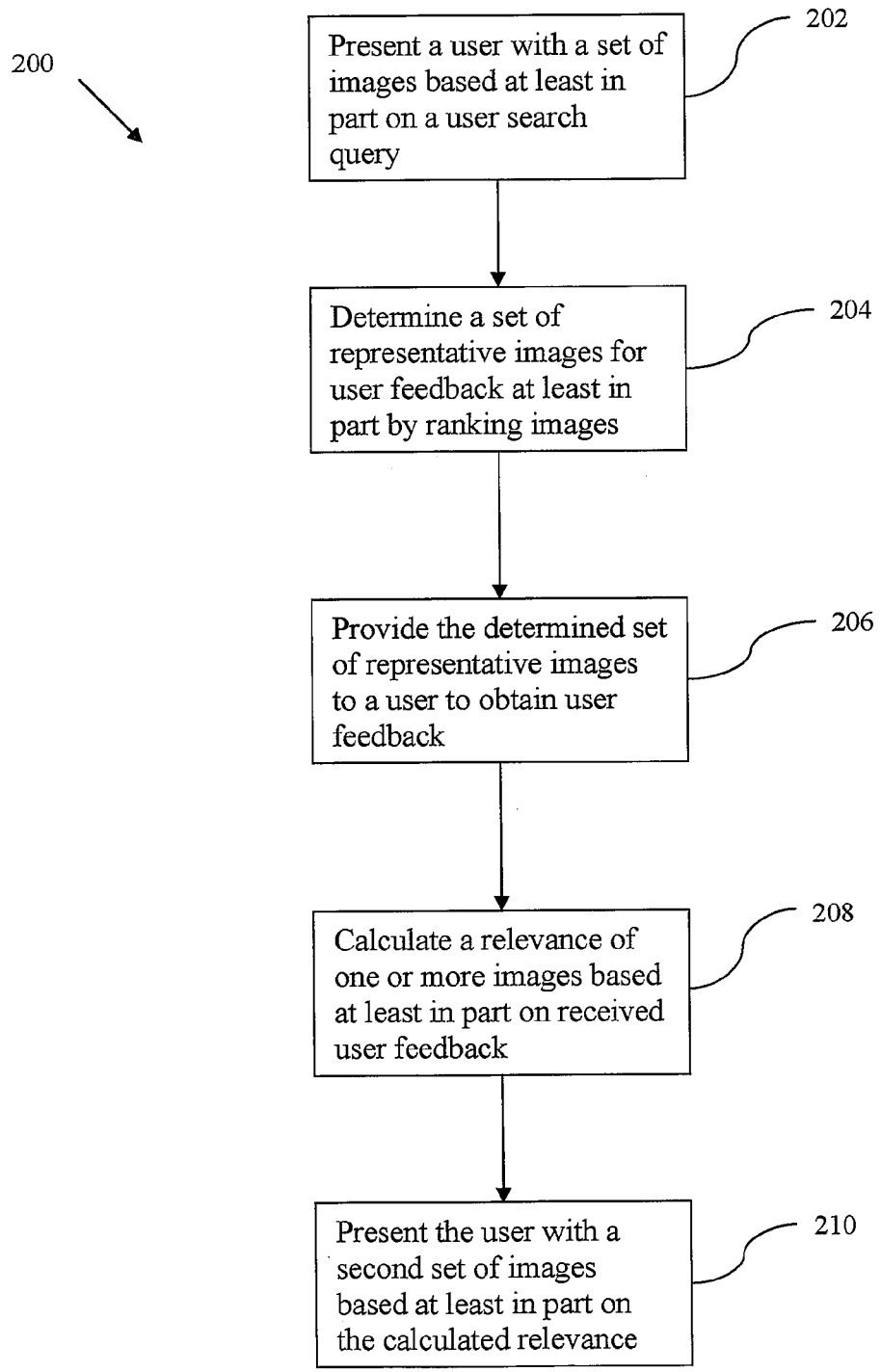
FIG. 2 is a flow chart of another method in accordance with an embodiment.

FIG. 2 is a flow chart of another method in accordance with an embodiment 200. With regard to box 202, an image retrieval process or system may present a user with a set of images based at least in part on a user search query. For example, a user may submit one or more images as a search query. The image retrieval process may extract one or more features from the submitted image, such as color, texture, shape, etc. The system may further form a feature vector based at least in part on the extracted one or more features. In an embodiment, the image retrieval process may search one or more images in a data set based at least on part on the feature vector corresponding to the submitted image and present one or more image search results to the user based at least in part on one or more ranking processes.

Under some circumstances, such as if a user is not satisfied with the presented image search results, the image retrieval process may determine a set of representative image for user feedback, as shown in box 204. As discussed above, the image retrieval process may determine the representative images based at least in part on an LD function as described above. For example, the image retrieval process may select labeled and unlabeled images from a data set in such a manner as to find a relatively minimal value of the LD function. With regard to box 206, the image retrieval process may provide the determined set of representative images to a user, at least in part to obtain user feedback, such as one or more labels for one or more of the representative images. For example, a user may rank one or more on the representative images as relevant or not relevant. In an embodiment, a user may also rank one or more of the representative images as highly relevant, relevant, somewhat relevant, somewhat not relevant, or not relevant. The user ranking may be transmitted to the image retrieval process, at least in part to assist in training the image retrieval process, for example.

With regard to box 208, the image retrieval process may calculate a relevance value for one or more of the images in a data set based at least in part on the transmitted user feedback. For example, based at least in part on the loss function described above, the image retrieval system may calculate a relevance value for one or more on the images in the data set based at least in part on the received user feedback, such as by determining a weighting vector for one or more of the images based at least in part on a comparison of a feature vector of one or more of the images to a feature vector of one or more of the labeled images. With regard to box 210, the image retrieval process may present the user with a second set of images based at least in part on the calculated relevance value of one or more images in the data set. For example, the image retrieval process may, based in part on one or more calculated relevance values, determine that a second set of one or more images from the data set are more likely to be relevant to the user's original image query and present the second set of images to the user as one or more image search results. It should be noted that the process of presenting a user with image search results and determining representative images for ranking by the user may repeat, under some circumstances, until the user is satisfied with the presented image search results.

Figure 3:
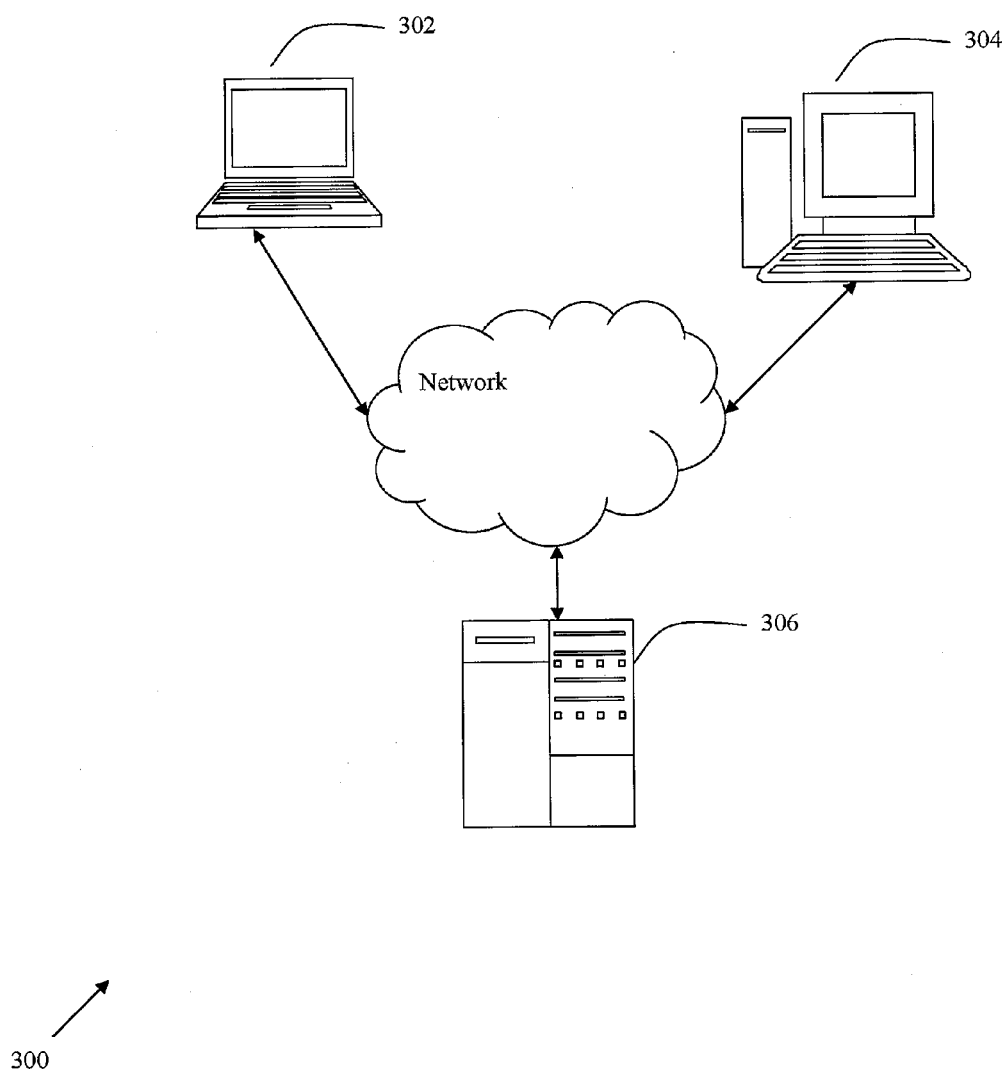
FIG. 3 is a schematic diagram of a system in accordance with an embodiment.

FIG. 3 is a schematic diagram of a system 300 in accordance with an embodiment. With regard to FIG. 3, a user may employ one or more computing platforms, such as computing platforms 302 and 304, to initiate an image search with one or more CBIR processes or systems. For example, a user may submit an image from computing platform 302 via a network to a CBIR process or system. In an embodiment, a CBIR process or system may comprise one or more application programs executing on one or more computing platforms, such as server 306, for example. Upon receiving an image for search purposes, a CBIR process or system may extract one or more features, such as shape, color, texture, etc., from the submitted image. In an embodiment, the CBIR process or system may form a feature vector base at least in part on the extracted one or more features. For example, the CBIR process or system may search for one or more image search results based at least in part on the feature vector formed from the submitted image and generate one or more image search results. In an embodiment, the CBIR process or system may transmit the generated one or more search results via the network to computing platform 302 for presentation to a user.

As discussed above, if a user is not satisfied with the generated search results the user may instruct computing platform 302 to inform the CBIR process or system that the generated images are not satisfactorily relevant to the submitted image query. The CBIR process or system may, in response, determine one or more representative images for presentation to the user, such as to obtain user feedback or labeling of the representative images, at least in part to train the image retrieval process, for example. As discussed above, the representative images may be determined, at least in part, by solving the LD equation described above. In an embodiment, the representative images may comprise one or more labeled and unlabeled images from the data set. In an embodiment, the CBIR process or system may transmit the determined representative images to computing platform 302 for presentation to a user.

In an embodiment, the user may rank the determined representative images. For example, the user may rank the determined representative images as relevant or not relevant. In an embodiment, a user may also rank the determined representative images as highly relevant, relevant, somewhat relevant, somewhat not relevant, or not relevant. The user ranking may be transmitted by computing platform 302 via the network to the CBIR process or system, at least in part to assist in training the image retrieval process, for example.

As discussed above, the CBIR process or system may calculate a relevance of one or more images in the data set based at least in part on the received user feedback. For example, using a loss function, such as the loss function described above, the CBIR process or system may determine a relevance, such as a weighting vector, for one or more of the images in the data set based at least in part on the received user feedback. In an embodiment, the CBIR process or system may determine a new set of image search results based at least in part on the determined relevance or weighting vector for presentation to the user. The new set of image search results may be transmitted to computing platform 302 via the network for presentation to the user. It should be noted, that the process of presenting image search results to the user and presenting representative images to the user for training the image retrieval process may be repeated a number of times, so that a user may end up with one or more relevant search results, for example.

In the preceding description, various aspects of claimed subject matter have been described. For purposes of explanation, specific numbers, systems or configurations were set forth to provide a thorough understanding of the claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method of improving image selection for training an image retrieval process comprising:
executing instructions by a processor to:
select one or more electronic signals that represent images from a set of images, said set of images including rated and unrated images, said selection of unrated representative images being based at least in part on one or more electronic signals that represent quantifiable characteristics of said unrated images, and said selection of rated representative images being based at least in part on one or more electronic signals that represent quantifiable characteristics of said rated images, wherein
said selection of said one or more electronic signals that represent said images is based at least in part on a solution to a Laplacian design learning process.

2. The method of claim 1 wherein said quantifiable characteristics comprise an image feature vector.

3. The method of claim 2, wherein said selection of said one or more electronic signals that represent said images of rated representative images being based at least in part on a feature vector of said rated images comprises said selection of said one or more electronic signals that represent said images of rated representative images being based at least in part on a feature vector of said rated images and ratings of said rated images.

4. The method of claim 1, and further comprising:
executing instructions by a processor to:
receive one or more electronic signals that represent user feedback for one or more of said selected one or more electronic signals that represent images from said set of images.

5. The method of claim 4, and further comprising:
executing instructions by a processor to:
generate one or more electronic signals that represent one or more image search results based at least in part on said received one or more electronic signals that represent user feedback.

6. The method of claim 5, and further comprising:
executing instructions by a processor to:
transmit said one or more electronic signals that represent said generated one or more image search results to a user.

7. An article comprising:
a non-transitory storage medium having instructions stored thereon, wherein said instructions, if executed by a computing platform, enable said computing platform to:
select representative images from a set of images, said set of images including rated and unrated images, said selection of unrated representative images being based at least in part on quantifiable characteristics of said unrated images, and said selection of rated representative images being based at least in part on quantifiable characteristics of said rated images, wherein said selection of said rated and said unrated representative images is based at least in part on a solution to a Laplacian design machine learning process.

8. The article of claim 7 wherein said quantifiable characteristics comprise an image feature vector.

9. The article of claim 8, wherein said selection of rated representative images being based at least in part on a feature vector of said rated images comprises said selection of rated representative images being based at least in part on a feature vector of said rated images and ratings of said rated images.

10. The article of claim 7, wherein said instructions, if executed by a computing platform, further enable said computing platform to receive user feedback for one or more of said selected representative images.

11. The article of claim 10, wherein said instructions, if executed by a computing platform, further enable said computing platform to generate one or more image search results based at least in part on said received user feedback.

12. The article of claim 11, wherein said instructions, if executed by a computing platform, further enable said computing platform to transmit said generated one or more image search results to a user.

13. A system comprising:
a computing platform having one or more processors to select representative images from a set of images, said set of images including rated and unrated images, said selection of unrated representative images by said one or more processors being based at least in part on quantifiable characteristics of said unrated images, and said selection of rated representative images being based at least in part on quantifiable characteristics of said rated images, wherein said selection of said rated and said unrated representative images is based at least in part on a solution to a Laplacian design machine learning process.

14. The system of claim 13, wherein said quantifiable characteristics comprise an image feature vector.

15. The system of claim 13, wherein said selection of rated representative images being based at least in part on a feature vector of said rated images comprises said selection of rated representative images being based at least in part on a feature vector of said rated images and ratings of said rated images.

16. The system of claim 13, wherein said computing platform is further adapted to receive user feedback for one or more of said selected representative images.

17. The system of claim 16, wherein said computing platform is further adapted to generate one or more image search results based at least in part on said received user feedback.

18. The system of claim 17, wherein said computing platform is further adapted to transmit said generated one or more image search results to a user.

19. A method comprising:
executing instructions by a processor to:
display to a user one or more electronic signals that represent a set of images based at least in part on a user search query;
based at least in part on one or more electronic signals representing a user response to said displayed images, determining a set of representative images for user feedback, wherein said determining comprises ranking one or more images based at least in part on a feature vector associated with those images and a rank associated with one or more of said images; and
provide one or more electronic signals that represent said determined set of representative images to said user at least in part to obtain user feedback, wherein said determining of said set of representative images is based at least in part on a solution to a Laplacian design machine learning process.

20. The method of claim 19, and further comprising:
executing instructions by a processor to:
calculate a relevance of one or more images based at least in part on receiving one or more electronic signals that represent said user feedback.

21. The method of claim 20, and further comprising:
executing instructions by a processor to:
display to said user one or more electronic signals that represent a second set of images based at least in part on said calculated relevance.

22. The method of claim 21, wherein calculating a relevance of one or more images comprises determining a difference between one or more feature vector associated with said one or more images and one or more feature vectors associated with one or more images that received positive user feedback.

23. The method of claim 20, wherein said a solution to said Laplacian design machine learning process includes determining a solution to the following:

$$\min_{z=(z1,\ldots,zk)} Tr(X^T(ZZ^T + \lambda_1 XLX^T + \lambda_2 I)^{-1} X);$$

wherein X comprises a matrix having feature vectors for one or more images in said set of representative images, and wherein Z comprises a matrix having feature vectors for said set of representative images, and wherein Tr comprises a matrix trace operation, and wherein I comprises an identity matrix, and wherein $\lambda_1$ comprises a first parameter, and wherein $\lambda_2$ comprises a second parameter, and wherein L comprises a matrix defined as L=D−S, where S comprises a weight matrix having one or more weighting parameters, and D comprises a diagonal matrix in which one or more i-th diagonal entries comprises an i-th row sum of S, and wherein $S_{ij}$ is a similarity measure of an i-th image and a j-th image in said set of representative images.

* * * * *